(12) United States Patent
Nieken et al.

(10) Patent No.: US 7,575,932 B2
(45) Date of Patent: Aug. 18, 2009

(54) METHOD FOR MONITORING AND ENSURING THE SAFETY OF EXOTHERMIC REACTIONS

(75) Inventors: Ulrich Nieken, Neustadt (DE); Jobst Rüdiger von Watzdorf, Mannheim (DE); Jochen Keβler, Haβloch (DE); Christina Benthack, Morris Plains, NJ (US); Hubertus Kröner, Neustadt (DE); Thomas Hauff, Limburgerhof (DE); Peter Schlemmer, Eisenberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 739 days.

(21) Appl. No.: 10/515,295

(22) PCT Filed: Jun. 6, 2003

(86) PCT No.: PCT/EP03/05946

§ 371 (c)(1),
(2), (4) Date: Nov. 22, 2004

(87) PCT Pub. No.: WO03/103826

PCT Pub. Date: Dec. 18, 2003

(65) Prior Publication Data

US 2005/0246067 A1      Nov. 3, 2005

(30) Foreign Application Priority Data

Jun. 7, 2002    (DE) .................................. 102 25 383

(51) Int. Cl.
*G01N 7/00* (2006.01)
*G01L 27/00* (2006.01)
*G01N 31/00* (2006.01)
*G06F 17/00* (2006.01)
*G05B 21/00* (2006.01)

(52) U.S. Cl. .................. 436/148; 702/98; 702/28; 702/31; 700/90; 700/266; 700/268

(58) Field of Classification Search .................. None
See application file for complete search history.

(56) References Cited

U.S. PATENT DOCUMENTS 6,498,219 B1    12/2002    Kroener et al.

FOREIGN PATENT DOCUMENTS

| DE | 297 23 396 U1 | 10/1998 |
|---|---|---|
| DE | 199 59 834 C1 | 8/2001 |
| WO | WO 00/47632 | 2/2000 |

OTHER PUBLICATIONS

A. Yermakova and V.I. Anikeev, Ind. Eng. Chem. Res. 39:1453-1472, 2000.*
O. Abel, "Scenario-integrated optimization of semi-batch reactor operation under safety constrains"; Fortschritt-Berichte VDI, Reihe 8, Nr. 867, VDI-Verlag, 2001; is believed to be relevant to the invention and has been found in the specification on page 2.
G. Deerberg; Zur sicherheitstechnischen Beurteilung von Semi-Batch-Prozessen mit Gas/Fluessigkeits-Systemen, Umsichtschriftenreihe Band 1; Frauenhofer IRB Verlag, 1997.

* cited by examiner

*Primary Examiner*—Jill Warden
*Assistant Examiner*—Timothy G Kingan
(74) *Attorney, Agent, or Firm*—Novak Druce + Quigg LLP (57) ABSTRACT

The invention relates to a method for monitoring exothermic reactions in a reactor, in which one or more starting materials react exothermically to give at least one product, and at least one gas is present in the reactor during operation as intended or during a runaway, comprising the following process:
A) measurement and storage of an initial temperature and an initial pressure in the reactor,
B) calculation of the amount of products and starting materials present in the reactor from an energy balance,
C) calculation of a maximum pressure raise that occurs on stepwise reaction of the amount of starting materials present, and
D) calculation of a runaway pressure from the maximum pressure raise that occurs, calculated in step C), and the measured initial pressure stored in step A).

11 Claims, 3 Drawing Sheets

METHOD FOR MONITORING AND ENSURING THE SAFETY OF EXOTHERMIC REACTIONS

The present invention relates to a method for monitoring and safeguarding exothermic reactions in a reactor, in particular for safeguarding exothermic reactions on an industrial scale. Exothermic reactions occur in numerous processes in chemistry and petrochemistry. In many cases, the liberation of energy in reaction systems of this type has to be limited in a suitable manner for safety reasons. In the case of deviation from operation as intended due to excessive liberation of energy, self-intensification of the energy release frequently occurs in reaction systems of this type, which can result in an inadmissible increase in pressure. The term 'runaway' of the reaction is used here. This increase in pressure in turn results in actuation of safety valves and escape of product or in the admissible operating pressures of the reactor installation being exceeded.

The problem of safeguarding exothermic reactions arises to a particular extent in the case of batch reactors operated by the feed process. Here, subsidence of the reactions and simultaneous continued feed of starting material can result in undesired accumulation of reactants. If the reaction re-commences in a 'sleeping batch' of this type, the release of energy owing to self-intensification is generally impossible to bring under control. A state-of-the-art reactor for exothermic chemical reactions therefore has complex protective devices, for example safety valves. Protective devices of this type are only of limited use since their actuation results in escape of relatively large amounts of the product. This escape of product is generally unacceptable for environmental reasons. However, it is generally not possible, for technical or economic reasons, to dispose of or collect the escaped product in an appropriate manner since the amounts released are extremely large. Further possible safety measures are, for example, the subject-matter of DE 297 23 396 U1, where the exothermic reaction is stopped by addition of an emergency terminator, or of DE 199 59 834 C1, where emergency cooling and pressure release of the reactor take place.

It is of considerable economic benefit for operation of a reactor of this type to provide a correct estimate of the potential risk of an exothermic reaction in the reactor. The safety measures mentioned above or others should only be taken in the case of an emergency in order wherever possible not to lose any starting materials or products. Furthermore, the safety reserves still present should be estimated as precisely as possible in order that the reactor can be operated under optimum conditions.

On-line methods for the control and safeguarding of reaction systems are known in the prior art. O. Abel, Scenario-integrated optimization of semi-batch reactor operation under safety constraints, Fortschritt-Berichte VDI, Series 8, No. 867, Düsseldorf, VDI-Verlag, 2001, describes a method for calculating the runaway pressure as part of a model-predictive regulator for batch reactors. The runaway pressure is calculated as a side condition of the optimization problem in order to ensure that the optimized settings of the adjustable variables (temperature, feed rate) represents safe operation even in the case of failure of the cooling. The method is restricted to semi-batch processes. Although this method is basically an on-line optimization method, the method developed cannot be applied in real time owing to the considerable amount of time it requires for computation. It is thus not suitable for monitoring an industrial reactor. Furthermore, it is not a method for monitoring a reactor, but instead for optimizing the feeds and operating temperature. The safety aspect is only considered as a side condition in the method.

G. Deerberg, Zur sicherheitstechnischen Beurteilung von Semi-Batch-Prozessen mit Gas-/Flüssigkeitssystemen, Environment and Safety Series Volume 1, Frauenhofer IRB-Verlag, 1997, describes a method which includes calculation of the pressure in the case of a run-away. It is attempted here to develop a simple equation for the runaway pressure which gives the runaway pressure with no iteration. This procedure circumvents computation-time problems, but is generally too inaccurate for practical applications.

WO 00/47632 relates to a method for on-line monitoring and control of the monomer conversion in emulsion polymerization, in which the amount of heat supplied to a reactor, the reaction enthalpy supplied through the monomer feed, and the amount of heat dissipated from the reactor are balanced continuously from an initialization time, and an amount of heat which has not been dissipated, which, in the case of a spontaneous adiabatic reaction, would result in an increase in the internal temperature and internal pressure of the reactor, is calculated. It is checked whether the adiabatic temperatures and pressures that potentially arise are always within pre-specified upper limits. If the upper limits are exceeded, the monomer feed into the reactor is reduced or interrupted. However, the method described in WO 00/47632 is kept very simple in the area of pressure calculation. For certain applications (for example emulsion polymerization), the pressure model described in the patent is unsuitable in the sense that it would also give runaway pressure which would result in shut-down of the reactor in the case of operation as intended.

It is an object of the present invention to provide an improved method for monitoring and safeguarding exothermic reactions in a reactor which enables economic operation of the reactor at the same time as high safety. In particular, the runaway pressure of a reaction system is estimated reliably, enabling potential states which could result in the admissible operating pressure being exceeded to be recognized in good time before a risk can arise.

We have found that this object is achieved in accordance with the invention by a method for monitoring exothermic reactions in a reactor, in which one or more starting materials react exothermically to give at least one product, and at least one gas is present in the reactor during operation as intended or during a runaway, comprising the following process steps:

A) measurement and storage of an initial temperature and an initial pressure in the reactor, B) calculation of the amount of products and starting materials present in the reactor from an energy balance, C) calculation of a maximum pressure rise that occurs on stepwise reaction of the amount of starting materials present, and D) calculation of a runaway pressure from the maximum pressure rise that occurs, calculated in step C), and the measured initial pressure stored in step A).

It is accordingly proposed in accordance with the invention that the maximum pressure rise in the reactor be determined by simulation of stepwise reaction of the starting materials present in the reactor, and the runaway pressure be calculated by addition of this maximum pressure rise and the measured initial pressure in the reactor. Comparison of the calculated runaway pressure with the design limits for the reactor provides information on the safety reserves still present. These safety reserves can be used to optimize operation, for example to increase the feed rate or raise the reaction temperature. The runaway pressure is calculated continuously throughout the reaction, enabling measures for safe termination of the reaction to be taken in good time—in particular before an actual runaway can be measured at all.

The method according to the invention can be applied to exothermic reactions in which at least one gas is present either during operation as intended or during a runaway. Operation as intended includes operation for which the plant is intended, designed and suitable in accordance with its technical purpose, and operating states which occur in the case of malfunction of components or in the case of incorrect operation without safety reasons preventing continuation of operation or admissible limit values being exceeded (admissible error range). The at least one gas causes a pressure build-up in the reactor. It is present in the reactor in the form of air, a protective gas or any desired other gas, is fed to the reactor as starting material or is formed during the exothermic reaction. The gas is formed in the exothermic reaction either owing to the formation of gaseous reaction products or by at least partial evaporation of the reactor contents or by both processes.

Simulated reaction of the amounts of starting materials present in the reactor in conversion steps enables precise determination of the maximum pressure rise occurring in the case of adiabatic runaway of the reactor that can be achieved even before the end of the adiabatic reaction. The end of the adiabatic reaction is reached when all the starting material present has reacted and the maximum temperature has thus been reached.

In accordance with the invention, the runaway pressure that would occur during adiabatic runaway of the reactor under the given conditions is determined from the calculated maximum pressure rise and the measured initial pressure in the reactor. Since the pressure model for calculating initial pressure and maximum pressure rise has been formulated conservatively in order to calculate an excessively high (i.e. safe) runaway pressure in all situations, the calculated initial pressure is higher than the measured initial pressure. Use of the measured initial pressure in step D) of the method according to the invention means that the error in the calculated initial pressure is not present in the value for the runaway pressure. The model is therefore more accurate and enables economical operation of the reactor.

In a preferred embodiment of the present invention, the amount of starting materials present is divided into k part-amounts $\Delta n$ for calculating the maximum pressure rise which occurs, and the following steps are repeated k times:

a) calculation of a temperature change $\Delta T$ which arises in the reactor and an amount of starting materials and products remaining in the reactor on reaction of a part-amount $\Delta n$ of starting materials in the exothermic reaction,
b) calculation of an intermediate temperature arising from the temperature change $\Delta T$,
c) calculation of an intermediate pressure in the reactor using a phase equilibrium calculation into which the intermediate temperature, the amount of starting materials and products which remains, and the volume of the reactor are entered as given quantities,
d) storage of the intermediate pressure as the starting pressure $p_1$ in the first run through steps a) to d),
e) calculation of an adiabatic pressure increase as the difference between the intermediate pressure and the starting pressure, and
f) storage of the adiabatic pressure increase as the maximum pressure rise if this exceeds a value previously stored as the maximum pressure rise.

The runaway pressure is calculated here by simulated stepwise reaction of the starting material(s) present in the reactor in k steps. The amounts of heat fed to the reactor in any form and the amounts of heat dissipated are balanced by means of an energy balance. The amount of starting materials known from the energy balance (method step B)) is notionally reacted in small amounts $\Delta n$ little by little in the exothermic reaction. A temperature increase $\Delta T$ arising in the reactor after each step arises from the amount of heat formed (reaction enthalpy), giving rise to a new intermediate temperature. For an adiabatic, closed system, the following equation, for example, applies:

$$m \cdot c_p \cdot dT = \sum_i H_i dn_i$$

where
m denotes the mass of the reactor contents,
$c_p$ denotes the heat capacity of the reactor contents,
dT denotes the temperature change,
$H_i$ denotes the reaction enthalpy of the ith starting material, and
$dn_i$ denotes the change in amount of the ith starting material.

Assuming uniform reaction of the starting materials, discretization into equidistant reaction increments $\Delta n_i$ gives the temperature increase after the jth reaction step:

$$\Delta T_j = \frac{\sum_i H_i \Delta n_i}{m \cdot c_p}$$

where j=1 to k (k steps)
and thus the intermediate temperature $$T_j = T_{j-1} + \Delta T_j$$

where
$T_{j-1}$ denotes the measured initial temperature for j=1 and the (j−1)th intermediate temperature for j=2 to k, and
$T_j$ denotes the jth intermediate temperature after j reaction steps.

The amounts of products and starting materials remaining in the reactor are re-calculated after each (virtual) reaction of a part-amount $\Delta n$. For example, the amounts of the individual substances (starting materials) are recalculated as follows after each of the k steps:

$$n_{i,j} = n_{i,j-1} - \Delta n_i$$

where
j=1 to k;
$n_{i,j}$ denotes the amount of the ith substance after the jth step, and
$n_{i,0}$ denotes the initial amounts of substance (from the energy balance).

An analogous relation is used to calculate the amounts of the products.

The intermediate pressure $p_j$ in the system is subsequently calculated from the intermediate temperature, the amounts of substance remaining, and the volume of the reactor using a phase equilibrium calculation.

The equation system for the phase equilibrium is resolved together with a constraint for the volume. This formulation of the phase equilibrium relations is also known as VT (volume-temperature) flash. This is a non-linear equation system which can only be resolved iteratively. In formal terms, the following can be written:

$$p_j = f(n_{i,j}, T_j, V)$$

The thermodynamic model used for the phase equilibrium makes the method independent of a particular recipe and results in a generally valid formulation. The model is valid both for systems with and without separation in the liquid phase (occurrence of two immiscible liquid phases). Special measures simplify the calculation in order to keep the computation time needed short (combination of components, estimation of the vapor pressure of water-soluble components).

In a first run through the method (first reaction step), the intermediate pressure is stored as the starting pressure $p_1$. In the subsequent runs through the method, the adiabatic pressure increase arises from the difference between the current intermediate pressure and the starting pressure. After each pressure increase calculation, it is checked whether this is the maximum. If the current pressure increase exceeds that in the preceding reaction steps, it is stored as the maximum pressure rise:

$$\Delta p_{max} = \max(p_j) - p_1.$$

Consequently, the value stored as the maximum pressure rise at the end of a pressure rise calculation corresponds to the maximum pressure increase arising within the k reaction steps.

In a preferred embodiment of the present invention, the amount of heat fed to the reactor, the reaction enthalpy fed to the reactor through supplied starting materials, and the amount of heat dissipated from the reactor via reactor cooling are taken into account in the energy balance for calculating the amount of products and starting materials present in the reactor. The amount of heat fed to the reactor, the reaction enthalpy fed to the reactor through supplied starting materials, and the amount of heat dissipated from the reactor are determined by means of temperature and flow-rate measurements in the reactor feeds and outflows and in the coolant circuits. The non-dissipated heat calculated by means of the heat balance gives, as proposed in WO 00/47632, the amount of unreacted starting materials. The energy balance evaluated, for example, for a semi-batch reactor has, for example, the following form:

$$U = \frac{Q}{\sum_i m_i H_i}$$

where
U denotes the instantaneous conversion,
Q denotes the amount of energy dissipated up to the current time,
$m_i$ denotes the amount of the ith starting material metered in,
$H_i$ denotes the reaction enthalpy of the ith starting material.

With the conversion calculated in this way and assuming uniform reaction, the amounts of starting material still present in the system $m_{i,rem}$ is given by $$m_{i,rem} = (1-U) m_i$$

and the substance amounts $$n_{i,0} = \frac{m_{i,rem}}{M_i}$$

The pressure calculation is started with these remaining amounts of starting material and the amount of product, likewise determined from the calculated conversion.

In a preferred embodiment of the present invention, interactions between products and starting materials in the reactor are taken into account when calculating the maximum pressure rise. For example, the vapor pressure of the substances which becomes established in the reactor is reduced in certain reaction systems due to interactions of the substances. A reduction in the vapor pressure of this type can be taken into account, for example, by introducing an activity coefficient $\gamma$. The activity coefficient is obtained from models which describe the interactions of the substances. The vapor pressure $p_D$ in a reactor can be calculated as part of the phase equilibrium calculation, for example using the following formula:

$$p_D = \sum_i \gamma_i x_i p_{0i}$$

where
$\gamma_i$ denotes the activity coefficient of the ith component,
$x_i$ denotes the molar fraction of the ith component, and
$p_{0,i}$ denotes the vapor pressure of the ith component.

The present invention furthermore relates to a method for the on-line monitoring and on-line safeguarding of exothermic reactions in a reactor. In this method, a simplified model is set up using the runaway pressures calculated by the method according to the invention for monitoring exothermic reactions (as described above). This simplified model is used on-line for monitoring and safeguarding the reactor. The reason for this is that the "rigorous" model described above is usually too complicated to be implemented in the real-time environment. Use is therefore made of the simplified model, which results in a considerably shortened computation time and significantly lower storage requirements. For certain applications, however, the rigorous model may also be suitable for real time. The simplified model is tested off-line point-by-point against the rigorous model in order to ensure that the simplified model is a conservative estimate of the rigorous model. The simplified model likewise gives values for the intermediate pressure $$p_j = f(n_{i,j}, T_j, V)$$

for the respective jth reaction step and consequently the associated adiabatic pressure increase. However, it is iteration-free and gives a conservative estimate ($p_{j(simple)} \geq p_{j(rigorous)}$) of the intermediate pressure in the "rigorous" model against which it has been validated point-by-point. An essential advantage of this method according to the invention is consequently its real-time suitability and thus its successful industrial implementation in on-line operation. The calculation of the maximum pressure rise and the associated runaway pressure in narrow time intervals is repeated throughout the exothermic reaction. The simplified model can comprise mathematical equations, a stored data table or a combination of the two.

In a preferred embodiment of the present invention, a safety computer which uses the simplified model to calculate whether a runaway pressure exceeds reactor-specific limit values serves to monitor and control exothermic reactions in a reactor. The safety computer initiates reactor safety measures where necessary.

If the calculated runaway pressure is greater than a reactor-specific limit value, reactor safety measures are consequently initiated. The reactor-specific limit value here is a fixed upper limit which depends, inter alia, on the pressure resistance of the reactor. The reactor safety measures preferably comprise one or more of the following measures: reduction in the starting-material feed rate, intensification of the reactor cooling, triggering of a terminator system and decompression of the reactor.

The methods according to the invention can be applied to exothermic reactions which are carried out in continuous, semi-continuous or bath reaction systems. They are suitable for all types of reactor.

The present invention furthermore relates to the use of the methods according to the invention for monitoring and safeguarding an emulsion polymerization. In the emulsion polymerization, the starting materials (principally monomers, emulsifiers, water, initiators and stabilizers) are introduced in pre-specified metering amounts into a reactor in which the emulsified monomers are converted exothermically into polymers. The methods according to the invention can advantageously also be used for systems having high vapor pressures, as occur, for example, in emulsion polymerization.

The present invention furthermore relates to the use of the methods according to the invention for monitoring and safeguarding a blowdown reactor in which the product of exothermic reactions is provisionally stored. The blowdown reactor is consequently monitored and safeguarded on-line by a separate pressure calculation in accordance with the method according to the invention.

The present invention is explained in greater detail below with reference to the drawing, in which.

Figure 1:
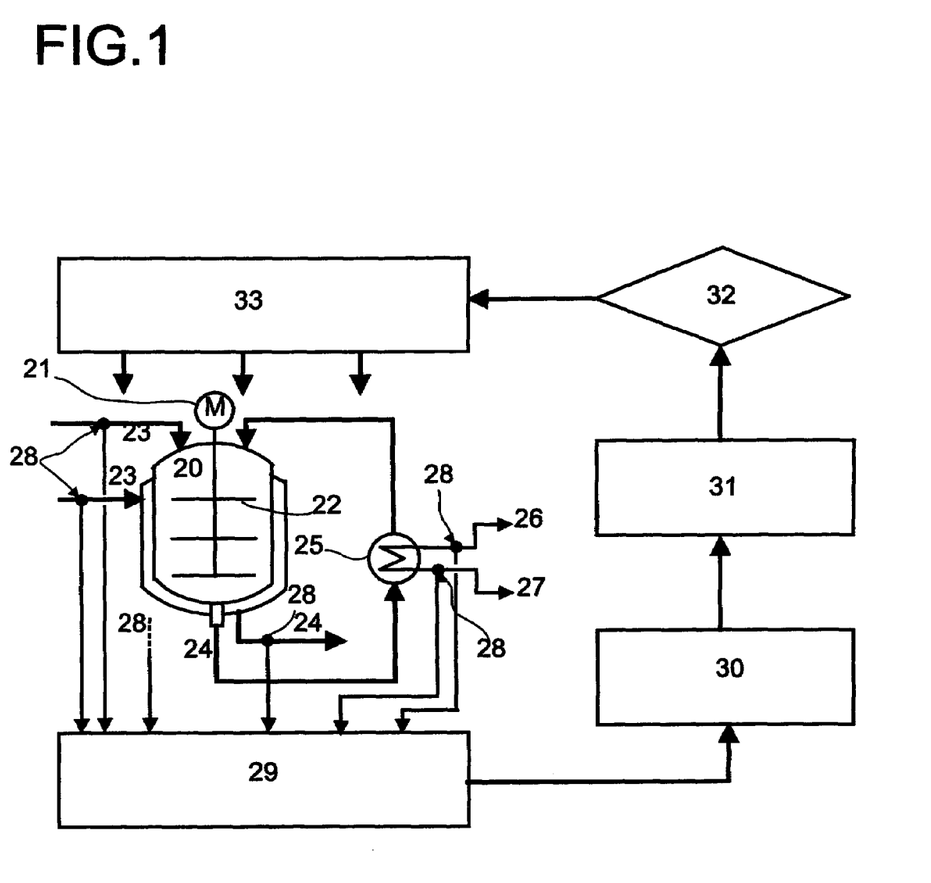
FIG. 1 shows a diagrammatic overview of the on-line monitoring and safeguarding of exothermic reactions.

A reactor 20 usually has a stirrer 22 driven by a motor 21, and diverse reactor feeds 23 and reactor outlets 24. One of the outlets 24 leads, for example, to a heat exchanger 25 and back to one of the feeds 23. The heat exchanger in turn has a heat-exchanger feed 26 and a heat-exchanger outlet 27. The energies 29 fed to and dissipated from the reactor are measured at numerous measurement points 28 in the reactor and heat-exchanger feeds 23, 26 and outlets 24, 27. An energy balance is set up, and the conversion is calculated from the energy balance 30. The amounts of products and starting materials currently in the reactor 20 are known from the conversion calculation 30. The next step is calculation of the runaway pressure 31 for the reactor 20 by the method according to the invention. On the basis of the comparison 32 of this runaway pressure with the maximum admissible pressure in the reactor 20, including all associated components, a decision is made on measures 33 to be taken to safeguard the reactor.

Figure 2:
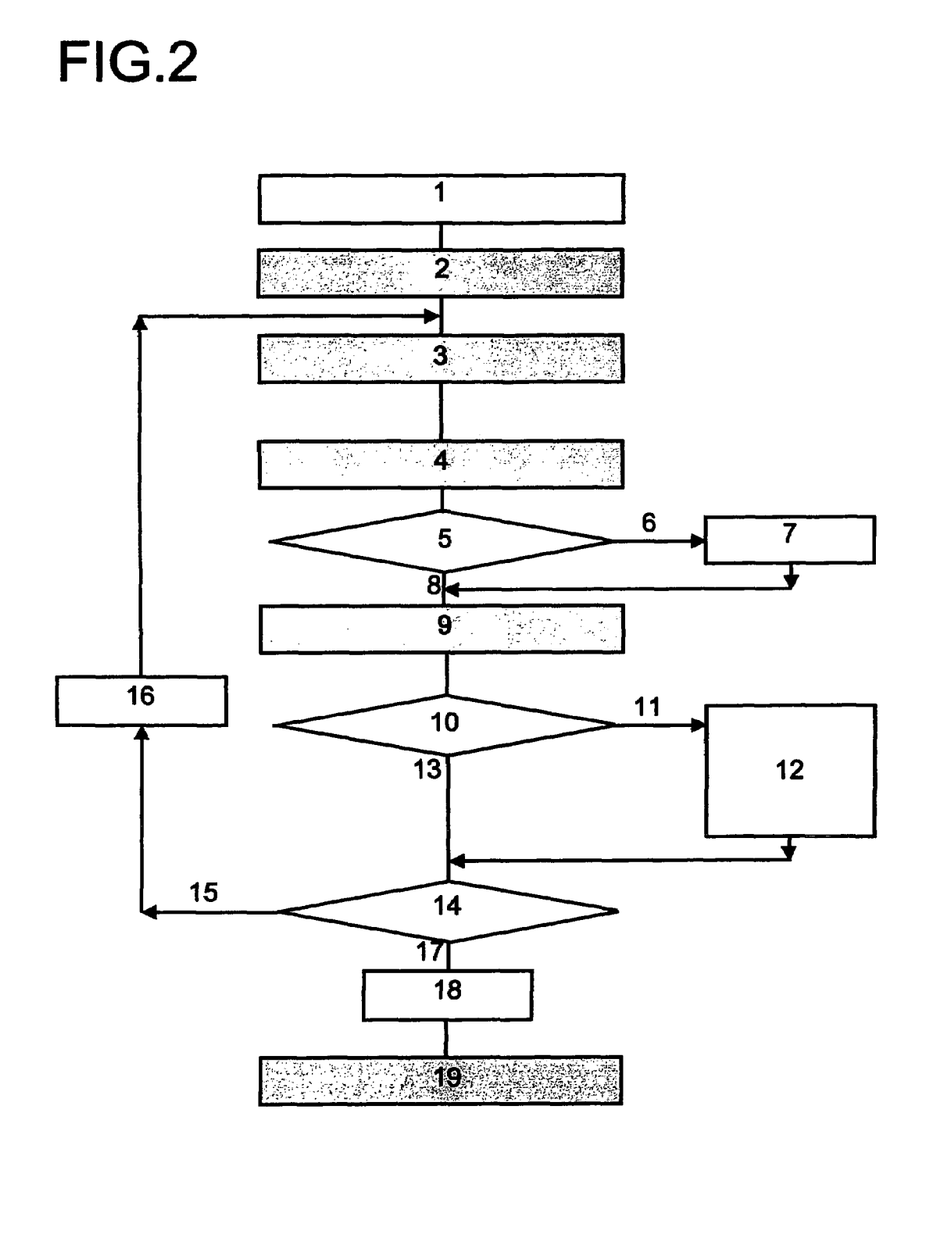
FIG. 2 shows a flow chart for pressure calculation by the method according to the invention for monitoring exothermic reactions.

FIG. 2 shows a flow chart for pressure calculation by the method according to the invention for monitoring exothermic reactions. Firstly, the input quantities 1 (starting-material and product amounts from the energy balance, measured initial temperature $T_0$, measured initial pressure $p_0$) are entered, and the pressure calculation is subsequently initialized 2. At the time of initialization, all quantities to be calculated in the method according to the invention are assigned the value "0", for example the maximum pressure rise ($\Delta p_{max}=0$). The amounts of starting materials entered as input quantities are divided into k part-amounts $\Delta n$, and in order to carry out the subsequent pressure calculation in k conversion steps, the step counter j is set to 1.

This is followed by calculation 3 of the intermediate temperature $T_j$. To this end, firstly the temperature change $\Delta T$ which arises in the exothermic reaction of a part-amount $\Delta n$ of the starting materials in the reactor is determined. The intermediate temperature $T_j$ is given by the total of the temperature change and the last-calculated intermediate temperature or, in the first run through the method (j=1), the measured initial temperature $T_0$. Furthermore, the amount of starting materials and products remaining in the reactor after conversion of a part-amount $\Delta n$ is calculated.

The next step is calculation 4 of the intermediate pressure $p_j$ which would become established as a consequence of the conversion of a part-amount $\Delta n$ in the reactor. The intermediate pressure $p_j$ is given either from a non-linear equation system in a phase equilibrium calculation on use of the rigorous off-line model or from the relation $$p_j = f(n_{i,j}, T_j, V)$$

on use of the simplified on-line model, which has been validated point-by-point against the rigorous model.

This is followed by an enquiry 5 whether this is the first run through the intermediate-pressure calculation, i.e. whether the counter of the steps j has the value "1". If this is the case (response 6 to enquiry 5="yes"), the calculated intermediate pressure $p_j$ is stored 7 as the starting pressure $p_1$.

The method according to the invention is continued after the starting pressure $p_1$ has been stored or directly after the response 8 to the enquiry 5 is "no" through the calculation 9 of the adiabatic pressure increase $\Delta p_j$. This is given by the difference between the starting pressure $p_1$ and the intermediate pressure $p_j$. This is followed by an enquiry 10 whether the adiabatic pressure increase $\Delta p_j$ is greater than the maximum pressure rise $\Delta p_{max}$. If this is the case (response 11 to enquiry 10="yes"), the adiabatic pressure increase $\Delta p_j$ is stored 12 as the maximum pressure rise $\Delta p_{max}$. Where appropriate, the associated intermediate temperature T can additionally be stored in order that the temperature $T_{\Delta pmax}$ prevailing at the time of the maximum pressure rise $\Delta p_{max}$ can be called up at the end of the method. A negative response 13 to enquiry 10 or the storage 12 of the said values is followed by an enquiry 14 whether the number of conversion steps k has been reached, i.e. whether the value of the step counter j corresponds to the value of k. If the response 15 is "no", the counter j is increased by "1" 16, and the method is repeated from the calculation 3 of the intermediate temperature until the counter j has reached the value k. The response 17 to the enquiry 14 is then "yes", and the intermediate temperature $T_{j=k}$ is stored as the end temperature $T_{end}$. Finally, the runaway pressure $p_d$ is determined 19 from the sum of the calculated maximum pressure rise $\Delta P_{max}$ and the measured initial pressure $p_0$. If the runaway pressure $p_d$ exceeds reactor-specific limit values, reactor safety measures are initiated in order to prevent runaway of the reactor.

In the on-line model, the method shown in FIG. 2 by means of a flow chart is repeated at narrow time intervals until the end of the reaction, i.e. the reactor is monitored continuously.

Figure 3:
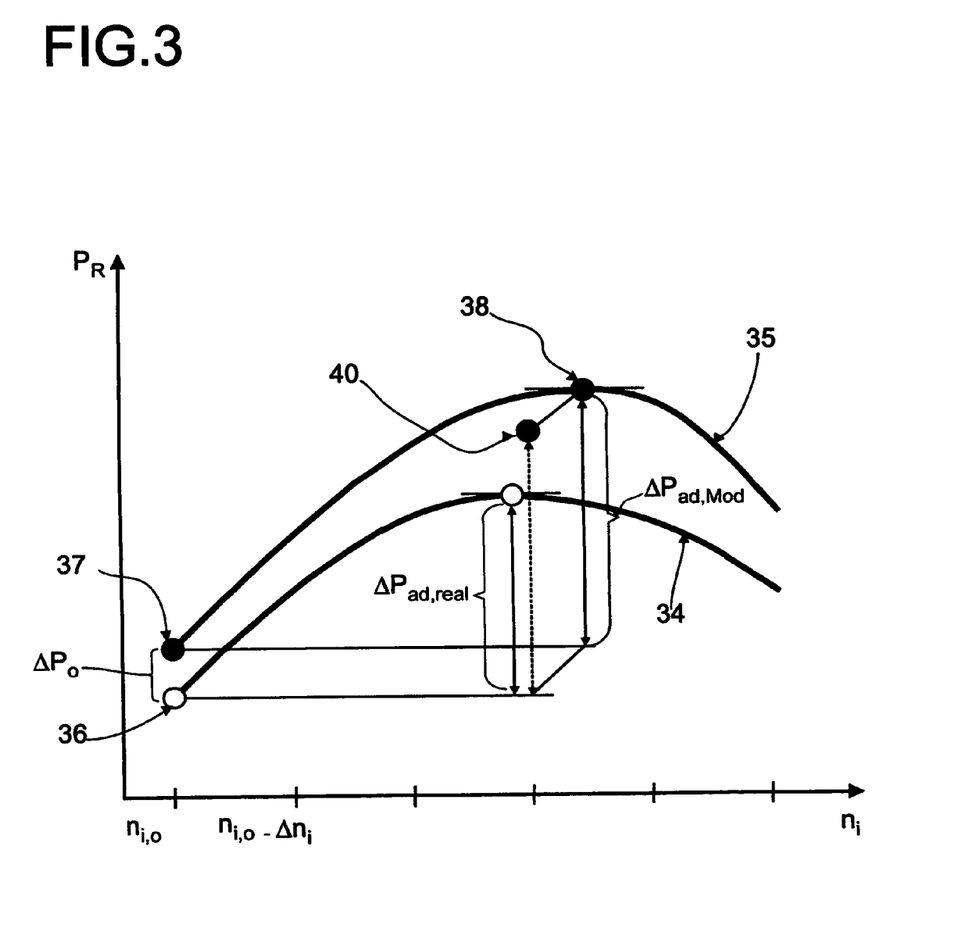
FIG. 3 shows a depiction of the calculation of the runaway pressure from the pressure rise and the initial pressure.

FIG. 3 shows a depiction of the calculation of the runaway pressure from the pressure increase and the calculated initial pressure.

In the diagram, the reactor pressure $p_R$ is plotted on the y axis, and the amount of starting material $n_i$ is plotted on the x axis. The amount of starting material $n_i$ has the value $n_{i,0}$ at the beginning and decreases toward 0 in steps $\Delta n_i$ along the x axis, i.e. the diagram shows reaction of the starting materials in steps of $\Delta n_i$. Two reactor pressure courses depending on the amount of starting material $n_i$ are shown, on the one hand the (normally unknown) actual pressure course in the case of a runaway 34 and on the other hand the runaway pressure 35 determined from the calculated pressure increase and the calculated initial pressure. The measured (real) initial pressure 36 here is a value of $\Delta p_0$ lower than the initial pressure 37 calculated by the method according to the invention. The model on which the method according to the invention is based furthermore gives (owing to its conservative design) a calculated adiabatic pressure increase $\Delta P_{ad,mod}$ whose value is larger than the real pressure increase $\Delta P_{ad,real}$. Consequently, the maximum runaway pressure 38 determined from the sum of the calculated initial pressure 37 and the calculated pressure increase $\Delta p_{ad,mod}$ is significantly higher than the real maximum runaway pressure 39, which is given by the sum of the measured real initial pressure 36 and the real pressure increase $\Delta p_{ad,real}$. Measures for safeguarding the reactor would already be implemented with considerable safety reserves still present in a runaway calculation carried out in this way since the calculated maximum runaway pressure 38 would, where appropriate, already exceed the maximum admissible reactor pressure. In order to achieve a more real estimation of the maximum runaway pressure, it is therefore determined from the sum of the measured initial pressure 36 and the calculated maximum pressure rise $\Delta p_{ad,mod(max)}$ in the method according to the invention. A maximum runaway pressure 40 determined in accordance with the invention, which conservatively estimates the real maximum runaway pressure 39, but nevertheless allows substantial utilization of the safety reserves in the reactor, thus arises before measures for safeguarding the reactor are implemented.

Example of a Phase Equilibrium Calculation

The phase equilibrium calculation can be formulated in various ways. A conventional formulation will now be presented. The following equations are resolved here:
- as balance for each component over all phases,
- phase equilibrium condition for each component,
- material data relations for vapor pressures, density, . . . and volume constraint.

The following equations, for example, are to be resolved:

| | |
|---|---|
| 1. $n_i = n_i^L + n_i^V$  $\forall i = 1, \ldots k$ | (mass balances) |
| 2. $x_i = \dfrac{n_i^L}{\sum n_i^L}$  $\forall i = 1, \ldots k$ | (molar fractions) |
| 3. $y_i = \dfrac{n_i^V}{\sum n_i^V}$  $\forall i = 1, \ldots k$ | " |
| 4. $y_i \cdot p \cdot \phi_i = x_i \cdot \gamma_i \cdot p_{0,i}$  $\forall i = 1, \ldots k$ | (phase equilibria) |
| 5. $V = \dfrac{\sum n_i^V \cdot M_i}{\rho^V} + \dfrac{\sum n_i^L \cdot M_i}{\rho^L}$ | (volume constraint) |
| 6. $p_{0,i} = p_{0,i}(T)$  $\forall i = 1, \ldots k$ | (mass relation) |
| 7. $\phi_i = \phi_i(T, p, y_i)$  $\forall i = 1, \ldots k$ | " |
| 8. $\gamma_i = \gamma_i(T, x_i)$  $\forall i = 1, \ldots k$ | " |
| 9. $\rho^V = \rho^V(y_i, p, T)$ | " |
| 10. $\rho^L = \rho^L(x_i, T)$ | " | where
$n_i$ denotes the amount of component i (gas and liquid phase)
$n_i^L$ denotes the amount of component i (liquid phase)
$n_i^V$ denotes the amount of component i (gas phase)
$y_i$ denotes the molar fraction of component i (gas phase)
$x_i$ denotes the molar fraction of component i (liquid phase)
p denotes the pressure
$\phi_i$ denotes the fugacity coefficient of component i
$\gamma_i$ denotes the activity coefficient of component i
$p_{0,i}$ denotes the vapor pressure of pure component i
$M_i$ denotes the molecular weight of component i
$\rho_V$ denotes the density of the gas phase
$\rho^L$ denotes the density of the liquid phase
V denotes the reactor volume
T denotes the temperature In total, the equation systems formed from the ten equations mentioned above contain 9 k+5 variables. The values for the quantities $n_i$, $M_i$, V and T, i.e. the values for 2 k+2 quantities, are pre-specified in the calculation. Since the ten general equations mentioned above form an equation system with 7 k+3 individual equations, all 9 k+5 variables can be determined.

For the mass relations (equations 6 to 10), various formulations are indicated in the prior art (for example γ via the NRTL, Flory-Huggins or UNIQUAC model, φ via the Peng-Robinson or Soave-Redlich-Kwong state equation).

The equation system comprising the above-mentioned equations can be resolved iteratively for calculation of the intermediate pressure needed for the calculation of the adiabatic pressure increase.

LIST OF REFERENCE NUMERALS

1 Entry of the input quantities
2 Initialization
3 Calculation of the intermediate temperature $T_j$
4 Calculation of the intermediate pressure $p_j$
5 Enquiry whether this is the first run (j=1?)
6 Response to enquiry 5="yes"
7 Storage of the intermediate pressure $p_j$ as starting pressure $p_1$
8 Response to enquiry 5="no"
9 Calculation of the adiabatic pressure increase $\Delta p_j$
10 Enquiry whether the adiabatic pressure increase is greater than the maximum pressure rise ($\Delta p_j > \Delta p_{max}$?).
11 Response to enquiry 10="yes"
12 Storage of the adiabatic pressure increase $\Delta p_j$ as the maximum pressure rise $\Delta p_{max}$
13 Response to enquiry 10="no"
14 Enquiry whether the number of conversion steps has been reached (j=k?)
15 Response to enquiry 14="no"
16 Increase in the step counter by 1 (j=j+1)
17 Response to enquiry 14="yes"
18 Storage of the intermediate temperature as the end temperature
19 Calculation of the runaway pressure Pd
20 Reactor
21 Motor
22 Stirrer
23 Reactor feeds
24 Reactor outlets
25 Heat exchanger
26 Heat-exchanger feed
27 Heat-exchanger outlet
28 Measurement points
29 Measurement of the energies input and discharged
30 Setting-up of an energy balance and conversion calculation therefrom
31 Calculation of the runaway pressure
32 Runaway pressure/maximum admissible pressure comparison 33 Measures for safeguarding the reactor
34 Actual pressure course during a runaway
35 Runaway pressure calculated from the calculated pressure increase and the calculated initial pressure
36 Measured initial pressure
37 Calculated initial pressure
38 Calculated maximum runaway pressure
39 Real maximum runaway pressure
40 Maximum runaway pressure determined in accordance with the invention

The invention claimed is:

1. A method for monitoring exothermic reactions in a reactor having a specific limit value of pressure, in which one or more starting materials react exothermically to give at least one product, and at least one gas is present in the reactor during operation as intended or during a runaway, comprising the following process steps:
   A) measurement and storage of an initial temperature and an initial pressure in the reactor,
   B) calculation of the amount of products and starting materials present in the reactor from an energy balance, and storage of the calculated amounts,
   C) calculation of a maximum pressure rise, that occurs in a step of a simulated stepwise reaction of the amount of starting materials present, in relation to a calculated starting pressure, which is greater than the measured initial pressure and
   D) calculation of a runaway pressure from the sum of the maximum pressure rise that occurs, calculated in step C), and the measured initial pressure stored in step A), and comparing the calculated runaway pressure with the reactor-specific limit value.

2. The method as claimed in claim 1, wherein, in order to calculate the maximum pressure rise that occurs (step C), the amount of starting materials present is divided into k part amounts $\Delta n$, and the following steps are carried out k times:
   a) calculation of a temperature change $\Delta T$ which arises in the reactor and an amount of starting materials and products remaining in the reactor on reaction of a part-amount $\Delta n$ of starting materials in the exothermic reaction,
   b) calculation of an intermediate temperature arising from the temperature change $\Delta T$,
   c) calculation of an intermediate pressure in the reactor using a phase equilibrium calculation into which the intermediate temperature, the amount of starting materials and products which remains, and the volume of the reactor are entered as given quantities,
   d) storage of the intermediate pressure as the starting pressure $p_1$ in the first run through steps a) to d),
   e) calculation of an adiabatic pressure increase as the difference between the intermediate pressure and the starting pressure, and
   f) storage of the adiabatic pressure increase as the maximum pressure rise if this exceeds a value previously stored as the maximum pressure rise.

3. The method as claimed in claim 1, wherein the heat fed to the reactor, the reaction enthalpy fed to the reactor by means of supplied starting materials, and the amount of heat dissipated from the reactor via reactor cooling are taken into account in the energy balance (step B).

4. The method as claimed in claim 1, wherein interactions between products and starting materials in the reactor are taken into account when calculating the maximum pressure rise (step C).

5. A method for the on-line monitoring and on-line safeguarding of exothermic reactions in a reactor, wherein a simplified model is set up on the basis of the runaway pressures calculated by the method as claimed in claim 1, and this simplified model is employed on-line for monitoring and safeguarding the reactor.

6. The method as claimed in claim 5, wherein a safety computer serves for monitoring and controlling exothermic reactions in a reactor, calculating, on the basis of the simplified model, whether the runaway pressure exceeds reactor-specific limit values and initiating, where appropriate, reactor safety measures.

7. The method as claimed in claim 6, wherein the reactor safety measures comprises one or more of the following measures:
   reduction in the starting-material feed rate, intensification of the reactocooling, triggering of a terminator system, and decompression of the reactor.

8. The method as claimed in claim 1, wherein the exothermic reactions are carried out continuously, semi-continuously or batchwise.

9. The method as claimed in claim 1 wherein the exothermic reaction is an emulsion polymerization reaction.

10. The method as claimed in claim 1 wherein the reactor is a blowdown reactor in which the product of the exothermic reactions is provisionally stored.

11. The method as claimed in claim 1 wherein the calculation of the maximum pressure rise in step (C) is based on a simulated reaction of the starting materials in the reactor.

* * * * *

UNITED STATES PATENT AND TRADEMARK OFFICE
CERTIFICATE OF CORRECTION

PATENT NO. : 7,575,932 B2
APPLICATION NO. : 10/515295
DATED : August 18, 2009
INVENTOR(S) : Nieken et al.

It is certified that error appears in the above-identified patent and that said Letters Patent is hereby corrected as shown below:

In Claim 7, col. 12, line 34:
"reactocooling" should read --reactor cooling--

In Claim 11, col. 12, line 46:
"materials in the reactor." should read --materials present in the reactor.--

Signed and Sealed this

Sixth Day of October, 2009

David J. Kappos
*Director of the United States Patent and Trademark Office*